United States Patent [19]
Edelmann et al.

[11] Patent Number: 5,996,762
[45] Date of Patent: Dec. 7, 1999

[54] DRIVE UNIT WITH ENGINE TRANSMISSION AND COOLANT CIRCUIT

[75] Inventors: Peter Edelmann, Heidenheim; Klaus Vogelsang, Crailsheim; Peter Rose, Heidenheim; Peter Heilinger, Crailsheim, all of Germany

[73] Assignee: Voith Turbo GmbH & Co. KG, Heidenheim, Germany

[21] Appl. No.: 08/946,708

[22] Filed: Oct. 8, 1997

[30] Foreign Application Priority Data

Oct. 9, 1996 [DE] Germany .................. 196 41 557

[51] Int. Cl.⁶ .................................................. B60K 41/26
[52] U.S. Cl. ................. 192/216; 123/41.31; 123/41.44
[58] Field of Search ................. 192/216; 123/41.44, 123/41.33, 41.08, 41.24, 41.31

[56] References Cited

U.S. PATENT DOCUMENTS

| | | |
|---|---|---|
| 1,637,382 | 1/1927 | Leipert . |
| 2,609,800 | 9/1952 | Pielstick ........................... 123/41.47 |
| 3,335,823 | 8/1967 | Nagel .................................... 188/90 |
| 3,404,732 | 10/1968 | Mork .................................. 123/41.49 |
| 3,572,480 | 3/1971 | Nagel ..................................... 192/4 B |
| 3,630,003 | 12/1971 | Ashton et al. ................. 123/41.33 X |
| 3,640,359 | 2/1972 | Clark et al. ............................ 192/3 B |
| 3,650,358 | 3/1972 | Bessiere ................................. 188/296 |
| 3,727,712 | 4/1973 | Colloton ......................... 123/41.31 X |
| 3,888,084 | 6/1975 | Hawkins ................................. 60/614 |
| 3,894,603 | 7/1975 | Winzeler ............................... 180/53 R |
| 4,132,283 | 1/1979 | McCurry .............................. 180/66 R |
| 4,321,990 | 3/1982 | Koch .................................... 192/13 R |
| 4,324,320 | 4/1982 | Spurlin et al. ......................... 188/271 |
| 4,662,320 | 5/1987 | Moriya ................................ 123/41.44 |
| 5,074,254 | 12/1991 | Takamatsu .......................... 123/41.44 |
| 5,373,198 | 12/1994 | Jimenez ................................... 307/68 |
| 5,549,174 | 8/1996 | Reis ....................................... 180/165 |
| 5,657,838 | 8/1997 | Vogelsang et al. ..................... 188/154 |
| 5,758,619 | 6/1998 | Edelmann et al. ..................... 123/319 |
| 5,762,582 | 6/1998 | Friedrich et al. ...................... 477/208 |
| 5,779,008 | 7/1998 | Vogelsang et al. ..................... 188/296 |
| 5,829,562 | 11/1998 | Adams et al. .............................. 192/4 |

FOREIGN PATENT DOCUMENTS

| | | |
|---|---|---|
| 461 723 | 6/1928 | Germany . |
| 662504 | 6/1938 | Germany . |
| 866 872 | 12/1952 | Germany . |
| 44 15 031 C1 | 5/1995 | Germany . |
| 44 08 350 C2 | 8/1995 | Germany . |
| 37 00 037 C2 | 12/1995 | Germany . |
| 195 09 417 A1 | 6/1996 | Germany . |
| 44 40 162 C2 | 3/1997 | Germany . |
| 61-132715 | 6/1986 | Japan . |
| 330671 | 6/1930 | United Kingdom . |

*Primary Examiner*—Charles A. Marmor
*Assistant Examiner*—Ha Ho
*Attorney, Agent, or Firm*—Baker & Daniels

[57] ABSTRACT

A drive unit having an engine comprising at least one engine output shaft, a transmission following the engine and a coolant circuit with at least one water pump. The water pump is arranged behind the engine viewed in the direction of force flow. The drive unit may also include a hydrodynamic retarder having a stator and a rotor.

19 Claims, 8 Drawing Sheets

DRIVE UNIT WITH ENGINE TRANSMISSION AND COOLANT CIRCUIT

The invention relates to a drive unit with an engine, comprising at least an engine output shaft, a transmission following the engine, and a coolant circuit including at least one water pump.

Drive units, specifically for internal combustion engines of this type are known. In prior drive units, the water pump is always disposed between the engine and fan, driven usually by a belt drive in contingence on the engine speed of rotation. A pump depending on engine speed of rotation is ideal for cooling the engine, but the prior arrangement has the disadvantage that in addition to the engine output shaft, which connects to the transmission, a further shaft is required to drive accessory units on the engine.

Also known, notably with heavy vehicles, are retarders which in braking actions at high speed of travel absorb the accruing kinetic braking energy and convert it to heat. Oil serves normally as the operating fluid of such retarders. The heat which transfers in the retarder to the operating fluid is passed to the coolant or the ambient air by means of a specific heat exchanger.

Also known, from DE 195 09 417, is a retarder whose operating medium is the operating medium of the cooling circuit. With the coolant serving also as operating fluid of the retarder, the accruing heat transfers directly to the coolant passed to the radiator, which makes a heat exchanger between two fluids, which is necessary, e.g., in a retarder operation with an oil fluid, dispensable. The retarder known from DE 195 09 417 is a so-called secondary retarder, i.e., the speed of rotation of the retarder depends on the speed of travel. A retarder operated depending on the speed of travel represents an optimum with respect to the retarder braking torque available for braking. Such arrangement of the retarder necessitates powering the retarder, e.g., by way of a take-off on the cardan shaft located on the transmission output side. Hence, the retarder is disposed in the vicinity of the transmission. Especially problematic with a retarder operated in contingence on the speed of travel is its cooling. In known retarders, cooling is insufficient, since the water pump is not operated depending on the speed of travel. The availability of the retarder is therefor limited.

The objective underlying the invention is to create a drive unit that avoids the disadvantages illustrated above; for a drive unit comprising a retarder, specifically, a very compact design can be provided. A further aspect of the invention is a very high availability of the retarder.

This objective is met by the invention in that a coolant circuit having at least one water pump is provided, and the water pump is arranged, when viewed in the direction of the transmission of force, behind the engine.

According to the invention, the water pump—or water pumps, in case several are used—is arranged in the direction of the transmission of force behind the engine and powered via an engine output shaft. This may be the engine output shaft extending to the clutch, but also a separate output shaft. Ideal for engine operation is a water pump having a speed of rotation proportional to the engine speed of rotation. Ideal for retarder operation is operating the water pump at a speed of rotation proportional to the speed of travel.

Arranging the water pump according to the invention in the direction of force flow behind the engine allows a compact combination of the components of the water pump and retarder, and, in the preferred embodiment, in an integrated assembly. A particularly compact arrangement disposes the water pump(s) between the engine and transmission, which results in short coolant circuit lines. In a further compact design, the water pump(s) may be arranged directly on or in the transmission itself. An especially space-saving design results when the water pumps are enclosed, along with the transmission, by a common wall, thus forming an assembly.

In one embodiment of the invention, the drive unit may comprise a hydrodynamic retarder that makes it possible, particularly in braking actions at high speed of travel, to absorb the accruing kinetic braking energy and convert it to heat. In a particularly favorable embodiment of the invention, the retarder and water pump would be integral parts of a single circuit, which circuit is at the same time a cooling circuit, for example the cooling circuit for the engine. All of the components would be integrated as great a degree as possible, possibly as a single assembly.

This presupposes the following features: the water pump should be operated depending on the engine speed of rotation; the retarder should be operated depending on the speed of travel; and there should be provided a pump that depends on the speed of travel, in order to optimally utilize the retarder for certain conditions of braking.

The hydrodynamic retarder is preferably a so-called secondary retarder such as known, e.g., from DE 195 09 417. However, also suitable are primary retarders such as known, e.g., from DE 44 40 162. Secondary retarders are preferably powered by a shaft depending on the speed of travel, for example, the cardan shaft extending from the transmission to the rear differential.

A particularly compact design results from arranging the retarder on or in the transmission. The retarder and transmission are in such arrangement preferably enclosed by a common wall and form an assembly so that the overall size is thereby reduced considerably. In a design more compact yet, the water pump and retarder are enclosed by a common wall and form an assembly. Composed of water pump and retarder, this assembly, in turn, may be disposed on or in the transmission, but it is possible also to arrange such assembly on or in the clutch housing.

In a first embodiment of the invention, the coolant of the coolant circuit and the operating medium of the retarder are separated from one another, and the operating medium of the retarder, e.g., is oil. Especially preferred, however, is using the coolant of the coolant circuit also as the operating medium of the retarder. Water or the usual water-glycol mixtures lend themselves preferably as coolant and operating medium. The coolant circuit and the operating medium circuit of the retarder may with same coolant or operating medium form a common circuit, which has the advantage that the heat accruing in the retarder can be dissipated quickly via the coolant and radiator.

To prevent the retarder during travel from running and acting against the driving engine, thus unnecessarily consuming energy, a changeover valve and a bypass line are provided with a common circuit of the operating medium and coolant. The changeover valve can then open the bypass line in the travel condition, allowing the coolant or operating medium of the retarder to circumvent the retarder, whereas the change-over valve ensures in the braking operation that the coolant or operating medium of the retarder flows through it, thereby making the necessary braking output available and dissipating the accruing heat.

The invention is described hereafter by way of example with the aid of the drawings, showing schematically in.

Figure 1:
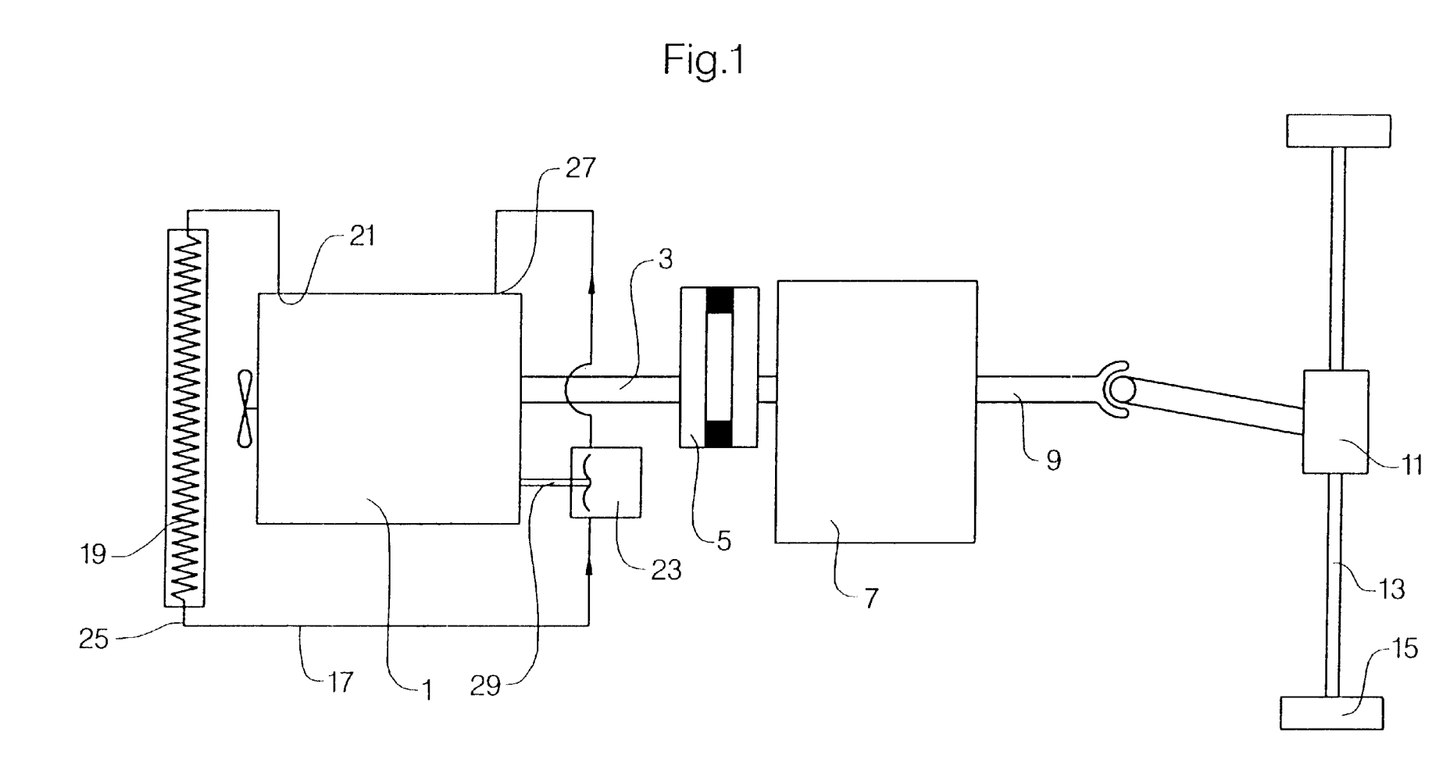
FIG. 1, a drive unit according to the invention with the water pump arranged on the engine output side.

FIG. 1 shows a drive unit according to the invention comprising an engine 1, which preferably is an internal combustion engine. Arranged on the engine output side is an engine output shaft 3 driven by the engine and extending to a clutch 5. The clutch 5 is followed by a transmission 7, which is in driving connection with the clutch via the engine output shaft 3. Arranged on the transmission output side is a cardan shaft 9 transmitting the engine torque, after gearing in the transmission, to a rear differential 11, from which the torque branches to the rear axle 13 and is then transmitted to the driven wheels 15 of the vehicle.

The internal combustion engine 1 is cooled by means of a coolant, preferably water with the customary additives, for example glycol as an antifreeze. The coolant circulates in a coolant circuit 17. Disposed in the coolant circuit 17 is a radiator 19, for example a slatted radiator, in which the hot coolant leaving via the outlet 21 upon discharge from the engine 1 is cooled. The water pump 23 then feeds the coolant, now cooled, via the radiator outlet line 25 to the coolant inlet 27 into the internal combustion engine 1. According to the invention, water pump 23 is arranged in the direction of force flow behind the engine, on its output side, more particularly between engine 1 and transmission 7. Of course, the water pump arranged in the direction of force flow behind the engine could be disposed also behind transmission 7. Water pump 23 is driven via a shaft 29 on the engine output side, and the shaft 29 may connect, either directly or geared, to the engine crankshaft or to the engine output shaft 3. This means that the water pump is always driven depending on the engine speed of rotation, either directly with no gearing at the engine speed or, in accordance with the gear ratio, which for the engine operation represents the ideal case. The present arrangement is distinguished in that it allows creating thereby a very compact drive unit where the front of the engine is not cluttered with accessory units, for example a water pump. This provides easy access to the engine 1, which, in turn, results in low cost of maintenance.

Figure 2:
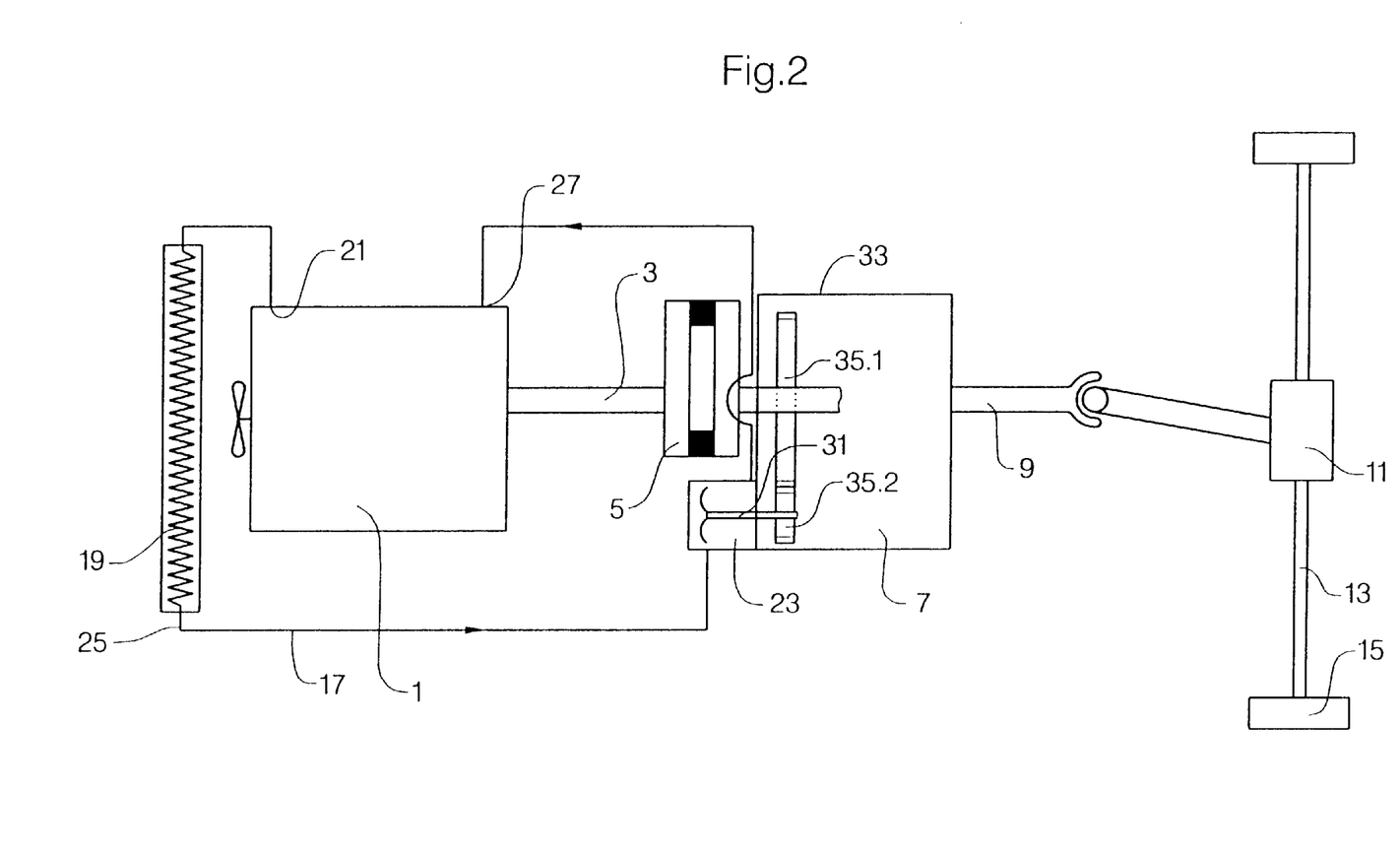
FIG. 2, a drive unit similar to FIG. 1, with the water pump arranged on the transmission.

In an improved embodiment according to FIG. 2, where same components are referenced identically as in FIG. 1, water pump 23 is mounted directly on transmission 7. The drive of water pump 23 on the engine output side is established by coupling the shaft 31 for the water pump 23 to the engine output shaft 3. This is effected in the present example by installing on the engine output shaft 3 within the transmission housing 33 a gear 35.1 meshing with gear 35.2 on shaft 31 of water pump 23. The speed of rotation of the engine output shaft 3 can be geared as required by appropriate design of the gears 35.1, 35.2, and thus adapted to the necessary pump output.

The embodiment relative to FIG. 2 is distinguished specifically in that the water pump is arranged directly on the transmission housing and., e.g., the partition between the pump 23 and transmission 33 can be eliminated, so that the water pump and transmission are enclosed by only a single housing wall, for example, housing wall 33. This represents a particularly compact and low-cost embodiment of the present invention.

Figure 3:
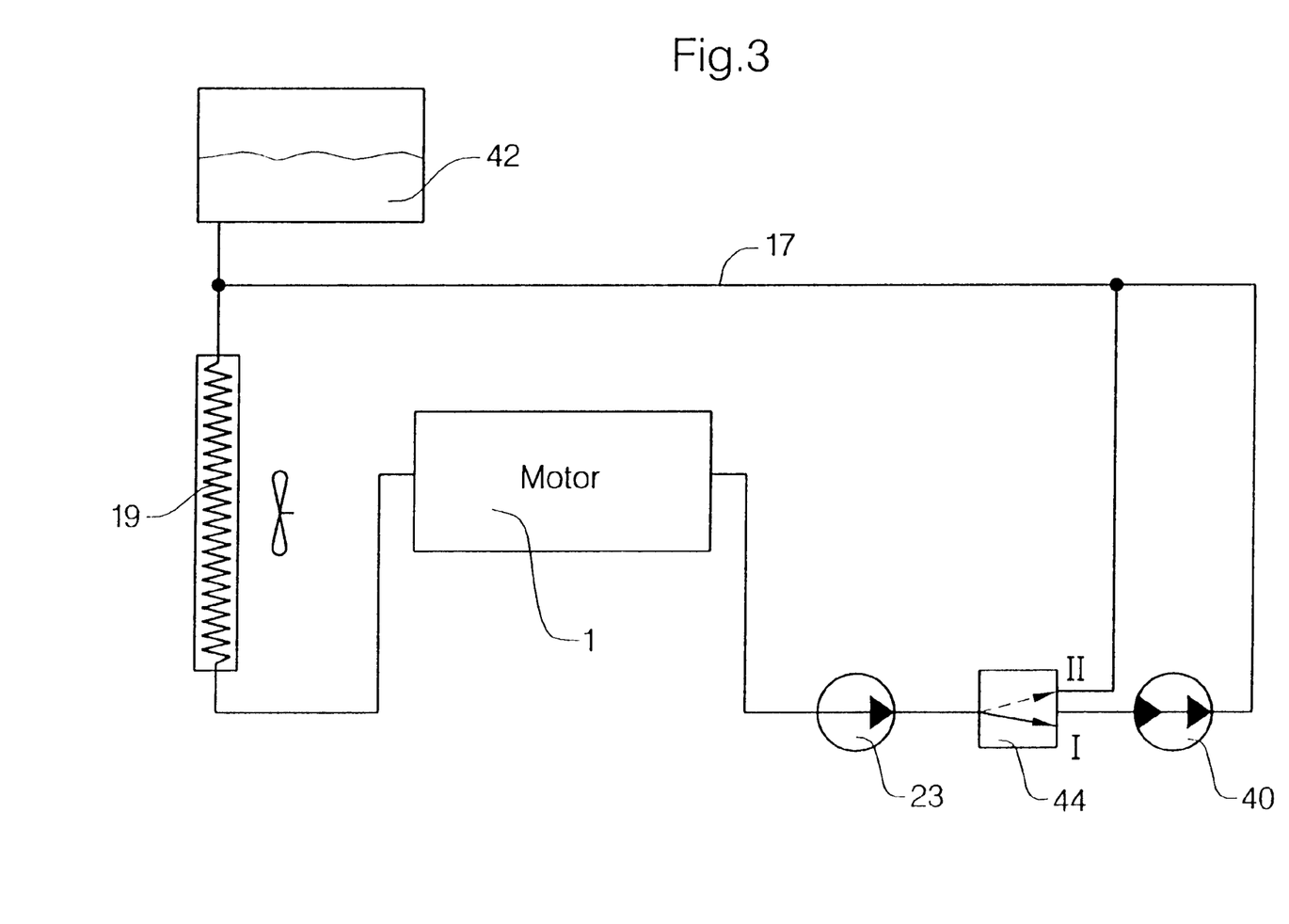
FIG. 3, a schematic of a drive unit with a water pump and a retarder as well as a common coolant circuit.

FIG. 3 depicts a schematic of an arrangement in which braking energy for the vehicle can be built up by means of a retarder 40. Shown in the schematic of FIG. 3 are only the engine and the cooling circuit 17 with pertaining units. The cooling circuit 17 comprises a radiator 19 and a water pump 23 arranged in the direction of force flow behind the engine. To assure that water pump 23 always feeds the necessary coolant quantity through coolant circuit 17, a receiver 42 is provided, which on the suction side of the pump, makes a predetermined pressure available.

Provided behind water pump 23, in the coolant circuit, is a changeover valve 44 that can be switched between positions I and II. In position I, the changeover valve 44 establishes a connection to retarder 40 incorporated in the coolant circuit, the coolant being the operating medium of retarder 40. The coolant is passed through retarder 40 and is available there as the operating medium in the braking operation. Hence, use of valve 44 allows channeling the operating medium selectively to retarder 40 or to bypass retarder 40 in position II. In this way it is ensured that the operating medium, presently the coolant, circulates in non-braking operation at no loss, whereas in braking operation the heat accruing in the retarder is removed via the coolant and can be dissipated to the ambient air in radiator 19. Basically, coolant circuit 17 is presently split in two cooling circuits. The first circuit is formed by pump 23, valve 44, radiator 19 and engine 1 as well as the lines between these units. This circuit is used in nonbraking operation. The second circuit is formed by pump 23, valve 44, retarder 40, radiator 19 and engine 1 as well as the pertaining lines. This circuit is used in the braking operation. Thus the coolant has the function of both operating medium in the retarder and coolant.

Figure 4:
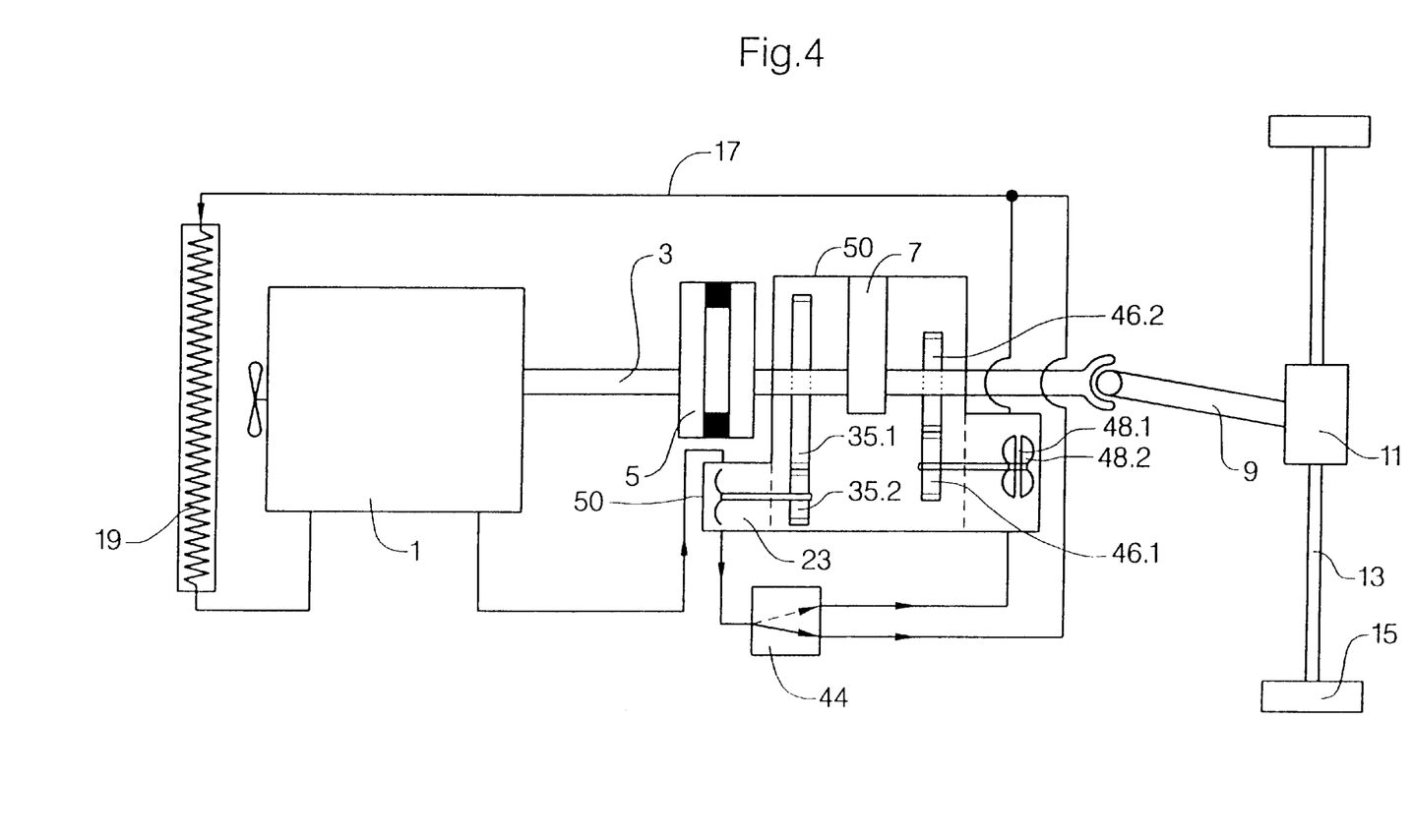
FIG. 4, a compact arrangement of the drive unit illustrated schematically in FIG. 3, with the water pump and retarder on the transmission.

FIG. 4 illustrates a possible arrangement of a cooling system relative to FIG. 3 in a vehicle drive unit, wherein the same components as in FIG. 3 are referenced identically. The embodiment according to FIG. 4 is distinguished notably by a compact design. Arranged on the transmission side near the engine 1 is the water pump 23, which presently is driven at the engine speed, for example via gears 35.1, 35.2, thus being operated depending on the engine speed of rotation. Arranged on the transmission side away from the engine, the retarder 40 connects to the cardan shaft 9 on the output side of the transmission, for example similarly to the water pump, via gears 46.1, 46.2. With this arrangement, the hydrodynamic retarder 40, comprising a stator impeller 48.2 and a rotor impeller 48.1, is constantly powered depending on the speed of travel. Hence, retarder 40 is a secondary retarder. The changeover valve 44 allows passing the coolant, which at the same time is the operating medium of the retarder, either through the retarder—which is the case in braking operation—or have it bypass the retarder in non-braking operation. As illustrated in FIG. 4, a single housing wall 50 encloses in this compact design the transmission 7 as well as the water pump 23 and retarder 40, which allows an especially space-saving design.

Figure 5:
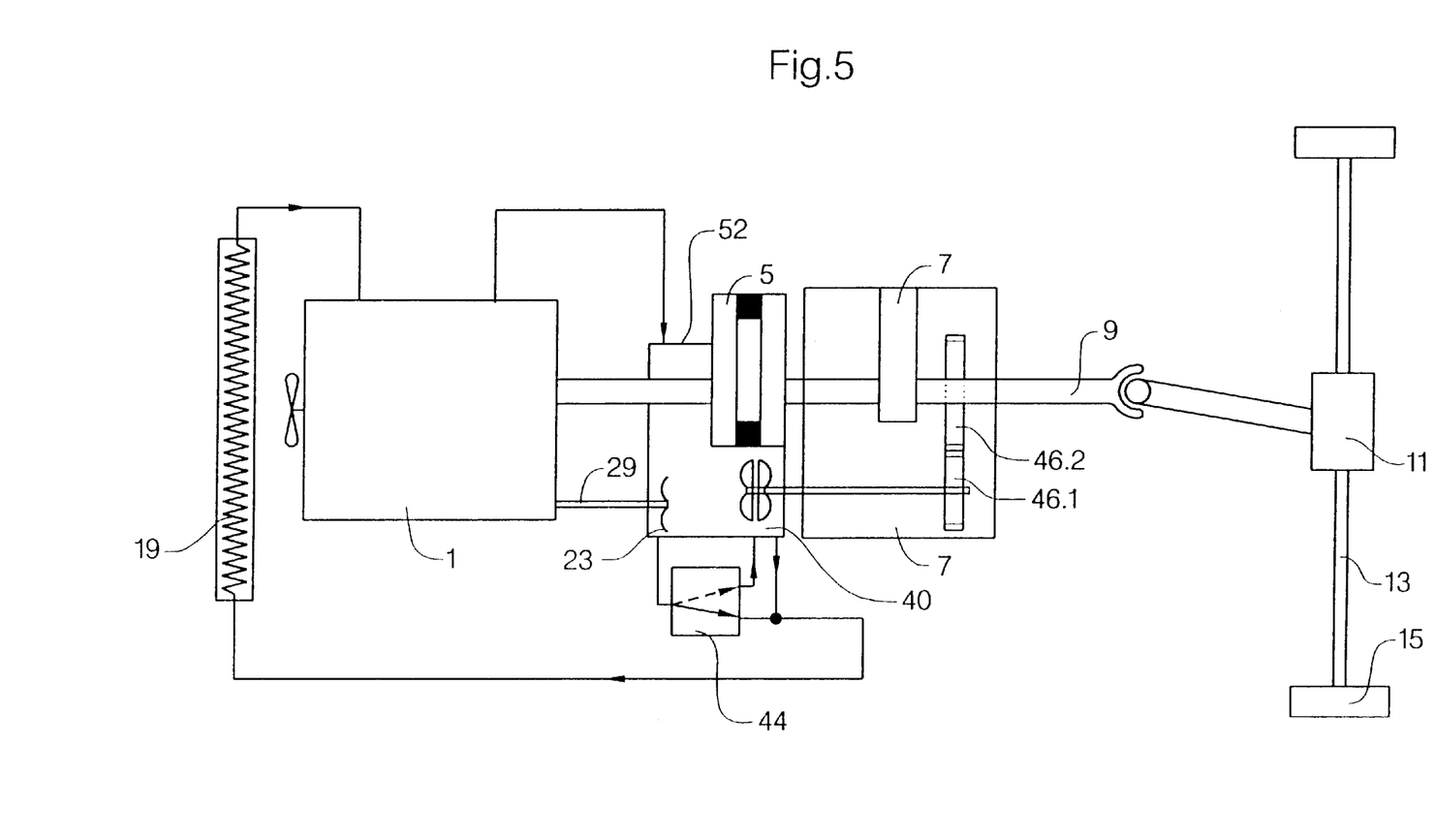
FIG. 5, an arrangement according to FIG. 3, with the water pump and retarder integrated in a common housing.

FIG. 5 depicts another arrangement of the one illustrated schematically in FIG. 3. According to FIG. 5, water pump 23 and retarder 40 are enclosed by a common housing wall 52 and arranged directly on the clutch 5 between the engine 1 and transmission 7. In this compact design, the two waterswept elements are thus combined. The water pump 23 in the common assembly is driven depending on engine speed of rotation, by means of a separate shaft 29, as illustrated in FIG. 1, whereas the retarder 40 is driven depending on the speed of travel. The retarder shaft is connected via a gearset 46.1, 46.2 to the cardan shaft 9 protruding on the transmission output side.

As in FIG. 4, a changeover valve 44 for nonbraking operation and braking operation is provided for switching between the two cooling circuits. The advantage of the arrangement according to FIG. 5, as mentioned above, is that the coolant-carrying components are combined in a single assembly enclosed by a common housing 52. This allows very easy disassembly for service work.

Figure 6:
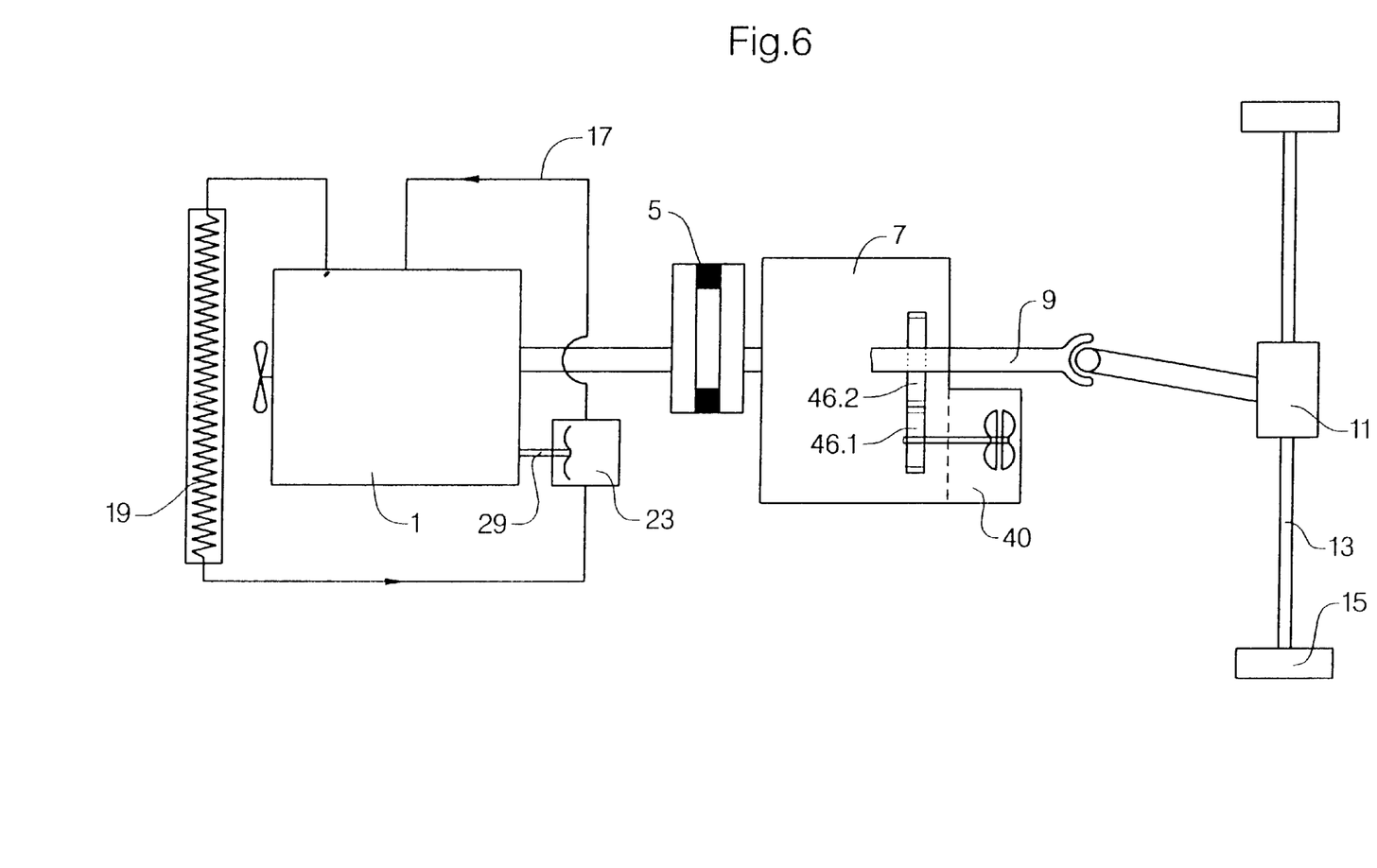
FIG. 6, a drive unit with a water pump arranged on the engine output side as well as a secondary retarder installed on the transmission.

FIG. 6 shows a further arrangement of a drive unit with a retarder 40 which, unlike in FIGS. 3–5, does not connect to the coolant circuit 17. The operating medium of the retarder thus is separated from the coolant and may be any suitable operating medium, for example oil. The water pump 23 is arranged again in the direction of force flow behind the engine, as in FIG. 1, and is powered via shaft 29 depending on the engine speed of rotation. The retarder is assembled directly to the transmission 7 and powered depending on the speed of travel; as in the preceding embodiments, the retarder shaft connects via a gearset 46.1, 46.2 to the cardan shaft 9 on the transmission output side. In an especially compact embodiment, the housing wall of the transmission 7 is also the housing wall of the retarder 40.

Figure 7:
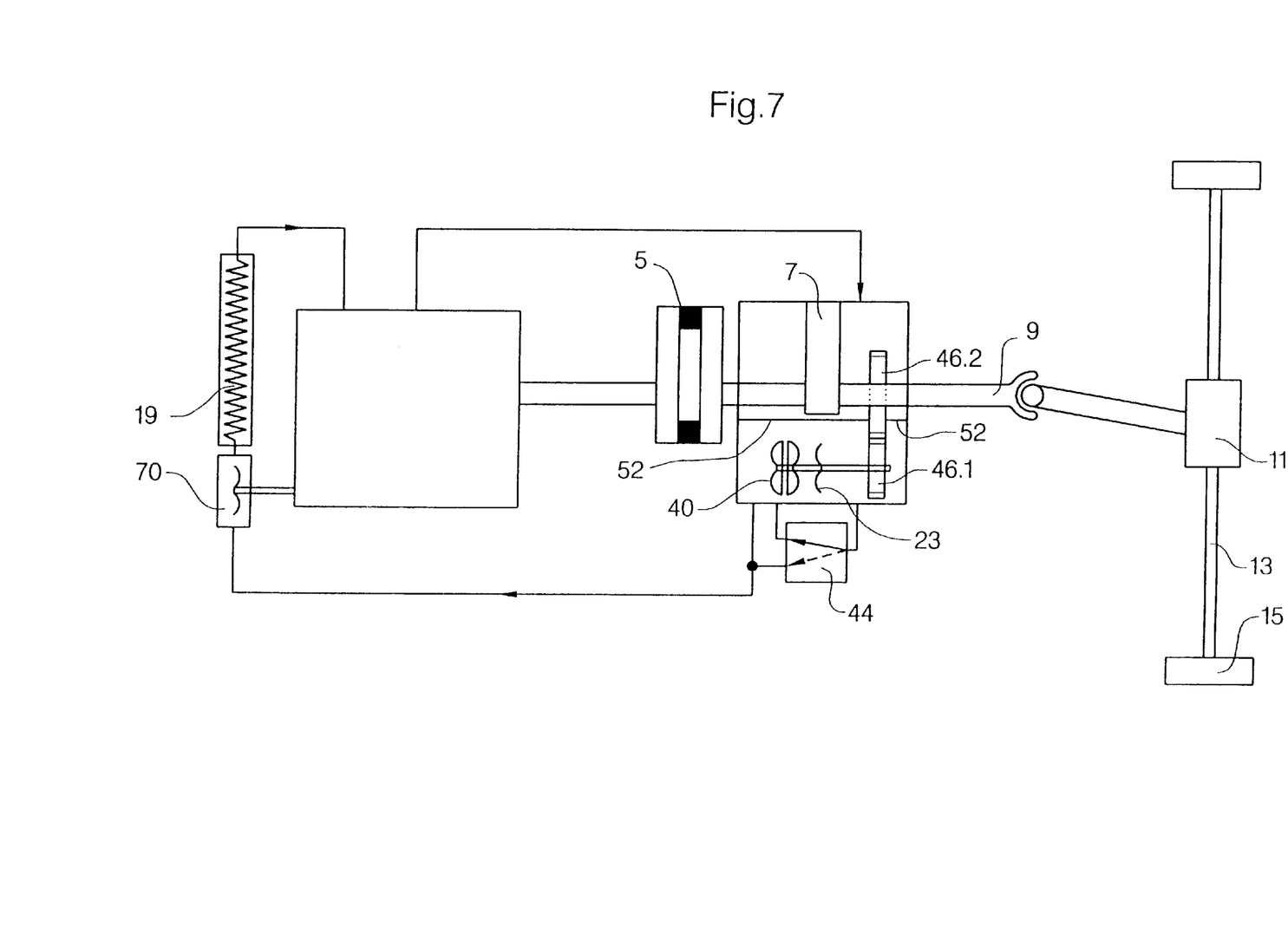
FIG. 7, an embodiment with the water pump and retarder integrated in a housing arranged in the transmission.

All of the water pumps shown in FIGS. 3–6 and driven depending on engine speed of rotation would be driven with appropriate coupling to the cardan shaft, for example, on the transmission output side. Depending on the speed of travel the pumps could be connected via a gearset, whereby optimum cooling could be guaranteed in the retarder operation. Such arrangement is shown in FIG. 7 wherein the retarder is driven depending on the speed of travel via a gearset 46.1, 46.2. Arranged on the rotor of the retarder 40 is a pump impeller of a water pump 23. Hence, the water pump 23 is driven depending on the speed of travel. This is particularly favorable with respect to the cooling output made available in the retarder operation. Provided for routing the coolant flow is again a changeover valve 44, as described previously.

While water pump 23 and retarder 40 are functionally separated in the exemplary embodiment illustrated in FIG. 7, a modification of the invention may provide for one and the same component representing functionally the water pump and retarder, that is, with the retarder assuming the function of the water pump, such as is known, for example, from DE-A-44 36 344.3. To guarantee sufficient cooling of the engine in its operation, a second water pump 70 depending on engine speed of rotation may be provided, for example on the front of the engine. The assembly formed of water pump 23 and retarder 40 is preferably enclosed by a common housing wall 52 and arranged within the transmission housing.

Figure 8:
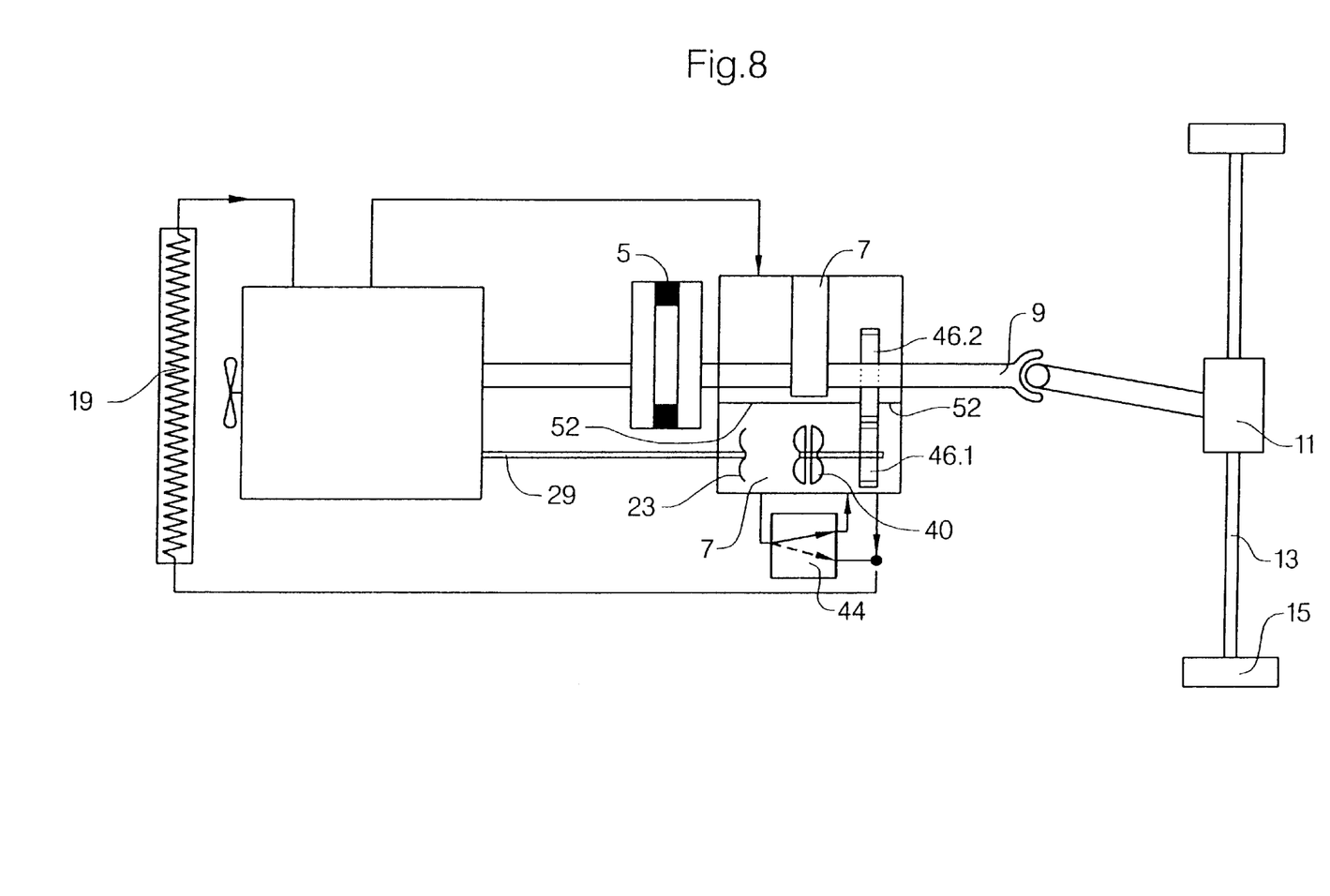
FIG. 8, a further embodiment similar to FIG. 7, with a pump, depending on engine speed of rotation, disposed in the transmission.

FIG. 8 shows a further embodiment of the invention according to FIG. 7 in which the water pump 23 is driven via shaft 29, depending on engine speed of rotation.

The present invention thus presents for the first time options for a compact arrangement of a drive unit with a water pump as well as, in specific cases, with a retarder.

We claim:

1. A drive unit in a wheeled vehicle, said drive unit comprising:

an engine including an output shaft;

a transmission drivingly connected to the engine and being disposed behind said engine in the direction of force flow from said engine; and a coolant circuit in fluid communication with said engine and including at least one coolant pump and a secondary retarder, said coolant pump being disposed behind said engine between said engine and transmission viewed in the direction of the force flow from said engine;

said secondary retarder being disposed behind said transmission viewed in the direction of force flow from the engine;

said coolant pump, secondary retarder and transmission forming an assembly wherein said coolant pump, secondary retarder and transmission are enclosed by a common wall.

2. The drive unit according to claim 1, wherein the coolant pump is driven depending on engine speed of rotation.

3. The drive unit according to claim 1, wherein the coolant pump is driven depending on the speed of travel.

4. The drive unit according to claim 1, wherein the coolant pump is disposed on the transmission.

5. The drive unit according to claim 1, wherein the coolant pump is disposed in the transmission.

6. The drive unit according to claim 5, wherein the coolant pump and the transmission form an assembly.

7. The drive unit according to claim 1, wherein the secondary retarder comprises a stator and a rotor.

8. The drive unit according to claim 7, wherein the coolant pump and the hydrodynamic retarder are functionally separated.

9. The drive unit according to claim 7, wherein the hydrodynamic retarder is driven by a shaft depending on the vehicle speed of travel.

10. The drive unit according to claim 8, wherein the hydrodynamic retarder is driven by a shaft depending on the engine speed of rotation.

11. The drive unit according to claim 7, wherein the retarder is mounted on the transmission.

12. The drive unit according to claim 7, wherein the retarder is disposed in the transmission.

13. The drive unit according to claim 1, wherein the secondary retarder is a hydrodynamic retarder including a stator and rotor, and wherein the retarder and the transmission are enclosed by a common wall.

14. The drive unit according to claim 13, wherein the coolant pump and the retarder form an assembly.

15. The drive unit according to claim 1, wherein the assembly formed by the coolant pump and retarder is arranged in the transmission.

16. The drive unit according to claim 1, wherein coolant of the coolant circuit is also an operating medium of the retarder.

17. The drive unit according to claim 16, wherein coolant of the coolant circuit and the operating medium of the retarder are water or a water mixture.

18. The drive unit according to claim 1, wherein the secondary retarder has a stator and a rotor, and wherein the retarder has an operating medium circuit, and said operating medium circuit forms with the coolant circuit a common circuit.

19. The drive unit according to claim 18, wherein the common circuit includes a bypass line and a changeover valve, such that coolant and an operating medium of the retarder can at least partly bypass the retarder.

* * * * *

UNITED STATES PATENT AND TRADEMARK OFFICE
CERTIFICATE OF CORRECTION

PATENT NO : 5,996,762
DATED : December 7, 1999
INVENTOR(S): Peter Edelmann, et al.

It is certified that error appears in the above-identified patent and that said Letters Patent is hereby corrected as shown below:

Claim 10, Column 6, Line 34, delete "8" and substitute therefor --7--

Claim 13, Column 6, Line 41, delete "the" second occurance and substitute therefor --said--.

Signed and Sealed this

Eighteenth Day of July, 2000

Attest:

Q. TODD DICKINSON

*Attesting Officer*  *Director of Patents and Trademarks*